United States Patent [19]
DeLeo

[11] 3,811,093
[45] May 14, 1974

[54] PHASE SENSITIVE DEMODULATOR WHICH AUTOMATICALLY COMPENSATES FOR VARIATIONS IN THE AC REFERENCE VOLTAGE

[75] Inventor: Louis P. DeLeo, Totowa, N.J.

[73] Assignee: The Singer Company, Little Falls, N.J.

[22] Filed: Sept. 19, 1972

[21] Appl. No.: 290,415

[52] U.S. Cl.............. 329/146, 307/232, 324/83 FE, 328/134, 328/155, 329/122, 329/136
[51] Int. Cl.............................................. H03d 1/04
[58] Field of Search........... 329/146, 112, 136, 122; 331/23, 25; 328/134, 155, 109; 324/83 FE; 307/232

[56] References Cited
UNITED STATES PATENTS

| | | | |
|---|---|---|---|
| 3,600,692 | 8/1971 | McGee | 328/155 X |
| 3,639,850 | 2/1972 | Brooks | 329/112 X |
| 3,235,800 | 2/1966 | Turrell | 328/134 X |

*Primary Examiner*—Alfred L. Brody
*Attorney, Agent, or Firm*—T. W. Kennedy

[57] ABSTRACT

A phase sensitive demodulator which also provides automatic compensation for variations in the AC reference voltage is shown. The same reference voltage used in generating the signal to be demodulated is itself demodulated and summed with a DC reference value to develop a control signal which is used to cause more or less of the signal to be demodulated as the reference voltage rises and falls thereby resulting in an output which does not change with changes in reference voltage.

15 Claims, 2 Drawing Figures

PHASE SENSITIVE DEMODULATOR WHICH AUTOMATICALLY COMPENSATES FOR VARIATIONS IN THE AC REFERENCE VOLTAGE

BACKGROUND OF THE INVENTION

This invention relates to phase sensitive voltage demodulators in general and more particularly to a demodulator which automatically compensates for variations in line voltage. In general a phase sensitive demodulator is a device which will provide a DC voltage output having a magnitude which is proportional to the magnitude of an input AC voltage and a polarity dependent on the phase of that input with respect to a reference AC voltage. Demodulators are commonly used with devices such as resolvers in which the voltage and phase of the output are related to a mechanical position. Typically in a resolver two outputs are provided, one an AC voltage proportional to the sine of the shaft angle and the other an AC voltage proportional to the cosine of the shaft angle. The sign of the output will be determined by the phase of the AC voltage with respect to a reference, e.g., in phase will be positive and out of phase will be negative.

In most applications in which the sine and cosine voltages are to be used they must first be converted to DC voltages. This is the function of the demodulator. Most prior art demodulators have simply rectified the AC voltage and provided means to sense the phase relationship and provide a positive or negative DC output accordingly.

The major drawback to a simple demodulator of this sort is that variations in the reference or line voltage will be reflected through to the output. If the resolver has a reference input of $E_R$ then the output voltages will be $$KE_R \sin \theta$$

and $$KE_R \cos \theta,$$

where $\theta$ is the resolver shaft angle.

If $E_R$ varies, the outputs will also vary. This problem may be solved by constructing a highly regulated reference $E_R$. This, however, is a costly solution. Problems of providing low harmonic distortion, low output impedance and reliability are also involved. In control systems where the demodulator is used in a closed loop it is also possible to avoid this problem by using ratios of output to input voltage. But where the demodulator is required to provide digital or analog outputs for use in a device such as a computer, such ratio techniques cannot be used. In these cases a voltage output which bears the same relationship to the quantity which it represents, e.g., sine and cos of shaft position, for all values of reference voltage is required.

SUMMARY OF THE INVENTION

The present circuit provides a phase sensitive demodulator which automatically provides compensation for variations in line voltage. The AC reference voltage is sensed, rectified and summed with a DC reference voltage representing a nominal reference value. Variations of the AC reference from the nominal value result in an output which is proportional to the difference between the two. This output is then used to control the demodulator causing greater or lessor portions of the input to be rectified.

FIGURE DESCRIPTIONS

DETAILED DESCRIPTION OF THE PREFERRED EMBODIMENT

Figure 1:
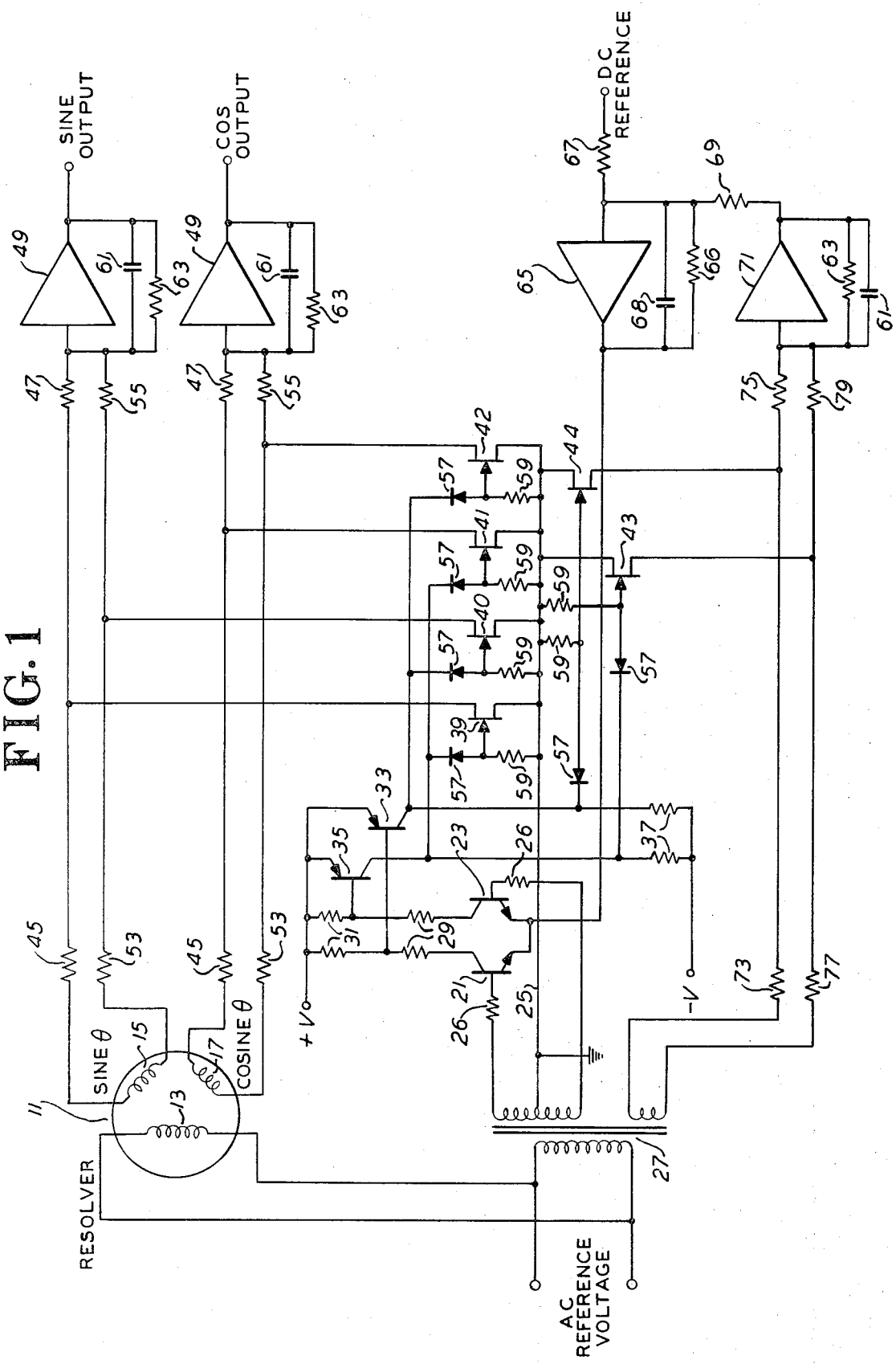
FIG. 1 is a schematic diagram of a preferred embodiment of the demodulator.

The demodulator circuit is shown on FIG. 1. A resolver 11 is included as an example of an input device. The resolver will be excited by a AC reference voltage across coil 13 which, for example, will be mounted on the resolver shaft. As the coil 13 rotates the voltages from coils 15 and 17, which will be fixed in the stator, will respectively provide outputs proportional to the sine and cosine of the shaft angle.

Operation of the demodulator without the automatic compensation will first be described. Assume that the emitters of transistors 21 and 23 are connected to ground buss 25. Each transistor has its base connected through a resistor 26 to one side of the secondary a transformer 27 which has as its primary input the reference voltage. The collectors of transistors 21 and 23 are each connected through a resistor 29 and a resistor 31 to a positive voltage supply. The center tap of the secondary of transformer 27 is connected to ground buss 25. In this arrangement transistor 21 will have a positive voltage on its base for one half the reference cycle, e.g., the positive half, during which time it will conduct and transistor 23 will have a positive voltage on its base during the other half cycle, during which it will conduct. Each of these transistors has associated with it another transistor. Transistor 33 has its base connected between resistors 29 and 31 in transistor 21's collector circuit and transistor 35 is similarly connected into the collector circuit of transistor 23. Each of transistors 33 and 35 has its emitter connected to a positive voltage and its collector connected through a resistor 37 to a negative voltage.

Thus, when transistor 21 is on during its half of the cycle, transistor 33 will also be on and will have a positive voltage at its collector output. Similarly, when transistor 23 is on, transistor 35 will provide a positive voltage output. When off, each of transistors 33 and 35 will have a negative voltage output.

These voltages are used to control transistors 39, 40, 41, 42, 43 and 44. Transistors 39 and 40 operate in conjunction with the sine output of resolver 11 and will be explained in detail. Transistors 41 and 42 perform a similar function for the cosine output and transistors 43 and 44 for the reference output to be described below. These transistors are shown as Field Effect Transistors (FETS). However, other types of high speed switching devices may also be used.

The one side of the sine output is provided through resistors 45 and 47 to the input of an operational amplifier 49. The other side is provided through resistors 53 and 55 to the same input of amplifier 49. At the junction of resistors 45 and 47 a connection is made to the source of FET 39. The junction of resistors 53 and 55 is connected to the source of FET 40. Each of the FETS 39–44 has its gate connected to the junction of a diode 57 and resistor 59 in series between the output of transistor 33 or 35 and the ground buss 25, and its drain connected to buss 25.

Assume for the moment that the sine output of coil 15 is in phase with the reference voltage. Also assume that the input to resistor 45 is high with respect to the input to resistor 53. During the positive portion of the cycle transistor 21 will be on, and thus transistor 33 will also be on. This will place a positive voltage at the diode 57 associated with FET 40 allowing the transistor to switch on and connect resistor 55 to ground. The positive cycle of the voltage will be provided to amplifier 49 through resistor 47, since FET 39 will have a negative voltage on its gate and be off. During the negative half of the cycle transistors 23 and 35 will be on turing FET 39 on and FET 40 off. This will cause the input to resistor 47 to be at the ground reference and the voltage into resistor 55 will become like another positive cycle. So, at the input to amplifier, 49 there will be a full wave rectified AC waveform. Amplifier 49, together with a capacitor 61 and resistor 63 in its feedback path, provide filtering and scaling in a well known manner. The result at the output of amplifier 49 is a filtered positive DC output.

If the voltage at the output of coil 15 is out of phase with the reference, it will be in its negative half cycle when transistor 21 is turned on in response to the positive half cycle of the reference. Thus, the voltage into resistor 47 will be negative with respect to the ground at resistor 55. Similarly, on the second half cycle the voltage at resistor 55 will be negative with respect to the ground at resistor 47. The result will be a full wave rectification with the negative half waves provided at the input of amplifier 49 resulting in a filtered negative DC output.

The demodulation circuit for the cosine voltage of coil 17 is identical and thus all its circuit elements except FETS 41 and 42 have been given identical numbers. (In the case of a single input to be demodulated this circuit would not be present. It is shown here since a resolver is used as an example of an input device).

In the beginning of the above description, the emitters of transistors 21 and 23 were assumed to be connected to ground buss 25. In actuality they are connected to the output of an amplifier 65 which has in its feedback path a resistor 66 and capacitor 68. This amplifier has as a first input a DC reference voltage through resistor 67. A second input is provided through resistor 69 from a demodulator amplifier 71 identical to the amplifiers 49 described above. Rather than having a resolver output as an input, amplifier 71 has a voltage proportional to the reference voltage from a secondary winding of transformer 27 as its input through resistors 73 and 75 and 77 and 79. This voltage will be demodulated under control of FETS 43 and 44, in the same manner as described above resulting in a negative DC output from amplifier 71 which is proportional to the AC reference voltage. When this negative voltage is summed with the positive DC reference voltage in amplifier 65 the result will be an error or control signal proportional to the difference between the DC reference and the demodulated AC reference.

This voltage is provided to the emitters of transistors 21 and 23. If the rectified AC reference equals the DC reference, the voltage will be zero and operation will be as described above. Assume that the reference voltage rises. The sine and cosine outputs from resolver 11 will rise a proportional amount and the control voltage from amplifier 65 will go to a negative value. Now transistor 21 will begin conducting before the beginning of the positive cycle and thus both transistor 21 and 23 will be on for a portion of the time. This results in both inputs to amplifier 49 being grounded for a portion of each cycle, in effect clipping the AC input to amplifier 49 and resulting in a lower output voltage than would be present if the whole wave were rectified. This reduction by proper scaling is made equal to the increase in reference voltage thus compensating for the rise in voltage. This voltage will also clip the AC voltage into amplifier 71. Thus, a closed loop control system results. Resistor 66 and capacitor 68 are selected to provide the desired system gain and response in accordance with well known practices. The result at the output of amplifier 49 will be approximately the same as before the voltage rose. If the reference were to drop a positive voltage would be provided out of amplifier 65 since the positive DC reference will now be greater than the negative rectified AC voltage. This would result in transistors 21 and 23 turning on later, i.e., after the voltage overcame the positive voltage on their emitters. Both transistors 21 and 23 would then be off at the same time, a condition under which the circuit would not work properly. That is, there would be an attempt to get more than a half cycle into amplifier 49.

In order to allow for both positive and negative variations in the AC reference voltage the DC reference input is set so that, with a nominal AC reference, the resulting output of amplifier 65 will be negative. Then, if the voltage rises, a more negative voltage output will result and, if it drops, a less negative output results thereby allowing control in both directions.

Figure 2:
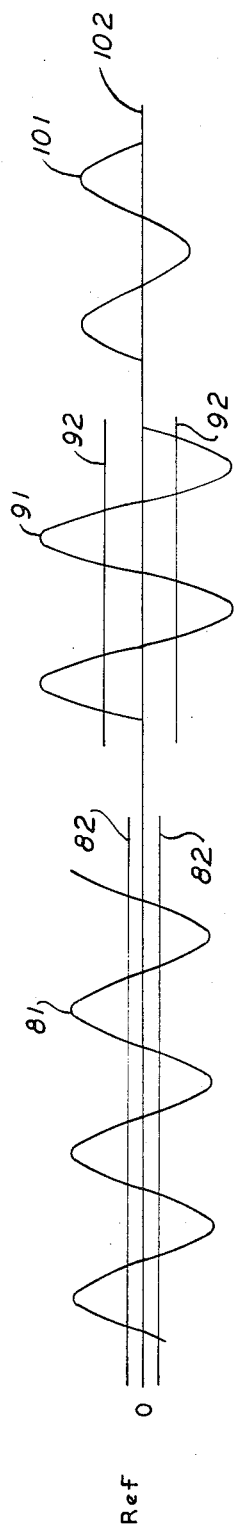
FIG. 2 is a waveform diagram helpful in understanding the operation of the circuit of FIG. 1.
Figure 2:
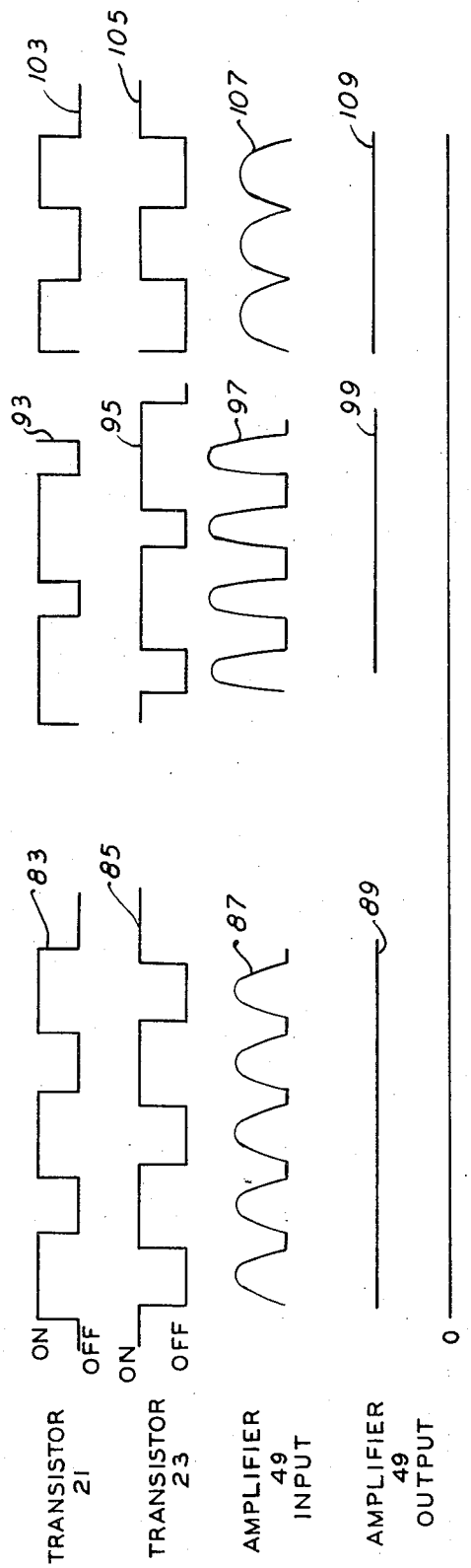

This is better illustrated by FIG. 2. Waveform 81 represents a nominal reference voltage input. For that voltage the control voltage out of amplifier 65 might be at the level indicated by lines 82. Two lines are shown since the waveform for transistor 23 would be the inverse of that shown. The result at the output of transistor 21 is shown by waveform 83 and that of transistor 23 by waveform 85. Each is one more than one half cycle. During the time both are on, amplifier 49 will have no input. This is shown by halfwaves of waveform 87. The resulting DC output of amplifier 49 is shown as line 89. Waveform 91 illustrates a rise in AC reference voltage. The control voltage from amplifier 65 will now be at the level shown by lines 92. The result at transistors 21 and 23 is shown respectively on waveforms 93 and 95. The input to amplifier 49 will be a higher voltage but will be on less of the time as shown by waveform 97. The resulting DC level 99, when averaged, however, will equal that of 89.

A reference voltage drop is illustrated by waveform 101. The control voltage 102 is shown at zero. (This is the limit for proper operation.) Now, as indicated by waveforms 103 and 105, each of transistors 21 and 23 will be on for one half cycle. The input to amplifier 49 will be as shown by waveform 107. Here the voltage is lower but is present longer. Thus, the average DC value 109 will equal both voltages 89 and 99.

The disclosed circuit was tested with an AC reference of 26v RMS and the gain of amplifier 65 set at about 100. Plus or minus 4 volt RMS variations in the reference voltage (15.4 percent) resulted in a maximum output change of 1.9 percent. With higher loop gain and careful circuit design, accuracy could be improved.

Thus, a demodulator which includes compensation for line voltage variations has been shown. Although a

What is claimed is:

1. In a system wherein a AC signal is developed in a device such as a resolver having as an input a reference AC voltage, said signal being said reference AC voltage times a function developed in the device, appartus to convert said AC signal to a DC signal and to automatically compensate for voltage variations in said AC reference voltage comprising:
   a. means to sense deviations in the magnitude of the AC reference voltage from a predetermined nominal value to provide a controlled voltage output commensurate with said deviations;
   b. a first phase senstive demodulator having the AC signal as an input and including means responsive to said control output to demodulate a portion of said AC signal as a function of said control output.

2. The invention according to claim 1 wherein said sensing means comprise:
   a. a second phase sensitive demodulator having as an input a voltage proportional to said AC reference voltage and providing a demodulated output voltage; and
   b. means to sum the demodulated output voltage and a reference DC voltage proportional to said nominal value to provide said control output.

3. The invention according to claim 2 wherein said second phase sensitive demodulator further includes means responsive to said control output thereby providing closed loop operation.

4. The invention according to claim 2 wherein said second demodulator comprises;
   a. first switching means having one side connected to ground and responsive to the positive cycle of said AC reference;
   b. second switching means having one side connected to ground and responsive to the negative cycle of said AC reference;
   c. filter means;
   d. first coupling means including a first pair of resistors in series coupling one side of said AC reference to said filter means and having the other side of said first switching means connected to the junction of said first pair of resistors; and
   e. second coupling means including a second pair of resistors in series coupling the other side of said AC reference to said filter means and having the other side of said second switching means connected to the junction of said second pair of resistors.

5. The invention according to claim 4 wherein said control output is provided as a bias to said first and second switching means.

6. The invention according to claim 5 wherein each of said first and second switching means comprise;
   a. a first transistor having one of its switching terminals coupled to said control output, its second switching terminal coupled to a voltage source and its base terminal coupled to a respective side of a second voltage proportional to said AC reference;
   b. a second transistor responsive to said first transistor such that when said first transistor is on said second transistor will also be on; and
   c. a switch having one side connected to ground and the other side connected to a respective junction of said first and second pairs of resistors and responsive to said second transistor to switch on when said second transistor is on.

7. The invention according to claim 6 wherein said first phase sensitive demodulator comprises:
   a. second filter means connected in circuit to said AC signal and adapted to provide said DC signal;
   b. third coupling means inlcuding a third pair of resistors in series coupling one side of said AC signal to said second filter means;
   c. a fourth coupling means including a fourth pair of resistors in series coupling the other side of said AC signal to said second filter means;
   d. a third switch having one side connected to ground and the other side to the junction of said third pair of resistors and responsive to the output of the second transistor associated with said one side of said second proportional voltage; and
   d. a fourth switch having one side connected to ground and the other side to the junction of said fourth pair of resistors and responsive to the output of the second transistor associated with said other side of said second porportional voltage.

8. The invention according to claim 7 wherein said first, second, third and fourth switches comprise field effect transistors.

9. The invention according to claim 7 wherein each of said first, and second filter means comprise an operational amplifier having a capacitor and resistor parallel in its feedback path.

10. The invention according to claim 7 wherein said AC signal is developed by a resolver having said AC reference as an input, said resolver providing a second AC signal which is proportional to the cosine of the shaft angle, and further including fifth and sixth coupling means identical to said third and fourth coupling means, coupling said second AC signal to a third filter means and fifth and sixth switches connected thereto and arranged in the same manner as said third and fourth switches.

11. In a system wherein an AC signal is developed in a device having as an input a reference AC votage, said signal being said reference AC voltage times a function developed in the device, a phase sensitive demodulator to convert said AC signal to a DC signal and to automatically compensate for voltage variations in said AC reference voltage comprising:
   a. first filter means connected in circuit to said AC reference and adapted to provide an output porportional to said voltage variations;
   b. a first means coupling one side of the AC reference to said first filter means;
   c. second means coupling the other side of said AC reference to said first filter means;
   d. first switching means coupled to said first coupling means and adapted to connect said coupling means to ground when on;
   e. second switching means coupled to said second coupling means and adapted to connect said coupling means to ground when on;
   f. summing means having as inputs the output of said first filter means and a DC reference voltage and providing a control output;
   g. second filter means connected in circuit to said AC signal and adapted to provide said DC signal;

h. third means coupling one side of the AC signal to said second filter means;
i. fourth means coupling the other side of the AC signal to said second filter means;
j. third switching means coupled to said third coupling means adapted to connect said coupling means to ground when on;
k. fourth switching means coupled to said fourth coupling means and adapted to connect said coupling means to ground when on;
l. fifth switching means responsive to the positive cycle of said AC reference and to said control output to provide a signal to switch on said first and third switching means; and
m. sixth switching means responsive to the negative cycle of said AC reference and to said control output to provide a signal to switch on said second and fourth switching means.

12. The invention according to claim 11 wherein said first, second, third and fourth switching means comprise field effect transistors.

13. The invention according to claim 11 wherein said first and second filter means comprise an operational amplifier having a capacitor and resistor parallel in its feedback path.

14. The invention according to claim 11 wherein said summing means comprise an operational amplifier.

15. The invention according to claim 11 wherein said fifth and sixth switches comprise transistor switches having their control inputs connected respectively to said one and said other side of a voltage proportioned to said AC reference and said transistor switches are biased by said control output.

* * * * *